United States Patent [19]

Brunner et al.

[11] Patent Number: 4,918,458
[45] Date of Patent: Apr. 17, 1990

[54] SECONDARY RADAR TRANSPONDER

[76] Inventors: Anton Brunner, Rosenstrasse 2, 8136 Wangen; Karl-Heinz Kristkoiz, Schlierachstrasse 4, 8000 Muenchen 90, both of Fed. Rep. of Germany

[21] Appl. No.: 153,922
[22] Filed: May 14, 1980
[30] Foreign Application Priority Data May 30, 1979 [DE] Fed. Rep. of Germany ....... 2921855
Jul. 20, 1979 [DE] Fed. Rep. of Germany ....... 2929343

[51] Int. Cl.⁴ .......................... G01S 13/74; H01Q 3/00
[52] U.S. Cl. ...................................... 343/795; 342/42; 343/807; 343/853
[58] Field of Search ....... 343/6.5 R, 100 CS, 700 MS, 343/781 R, 795, 807, 814, 853; 342/42, 45, 367

[56] References Cited

U.S. PATENT DOCUMENTS 2,234,244  3/1941  Gossel ........................ 343/100 CS
3,274,598  9/1966  Cleeton ....................... 343/6.5 R X
3,500,406  3/1970  Parker ......................... 343/6.5 R
4,114,163  9/1978  Borowick ..................... 343/795 X
4,151,532  4/1979  Kaloi .......................... 343/700 MS

FOREIGN PATENT DOCUMENTS

2354550  5/1975  Fed. Rep. of Germany .
2629502  1/1978  Fed. Rep. of Germany .

Primary Examiner—T. H. Tubbesing

[57] ABSTRACT

A secondary radar transponder on a mobile target has an antenna arrangement which can receive interrogation signals from all directions and radiate reply signals. The antenna arrangement includes several individual antennas, each of which, with its primary lobe, covers a specific sector of the entire 360° range and is connected to a receiver, so that through receiving level comparison, that particular sector from which the interrogation signal incides can be ascertained. The reply signal is then radiated only by the individual antenna covering that particular sector. The transponder is particularly suited for identification friend-foe (IFF) purposes.

41 Claims, 7 Drawing Sheets

SECONDARY RADAR TRANSPONDER

BACKGROUND OF THE INVENTION

1. Field of the Invention

The present invention relates to a secondary radar transponder comprising an antenna arrangement which can receive interrogation signals from all directions and which radiates reply signals.

2. Description of the Prior Art

In secondary radar operation, for example, in the military field for identification friend or foe (IFF), all possible types of targets, e.g. land craft, aircraft, ships, are interrogated from fixed or mobile radar positions. For this purpose, these targets must have transmitting-receiving installations, i.e. a so-called transponder, having a suitable antenna arrangement.

Such an antenna arrangement must be able to receive interrogation signals from all directions and retransmit reply signals. Depending upon the type of identification system, the receiving signal (interrogation) and the transmitting signal (reply signal) can lie in adjacent frequency ranges or in frequency ranges which are far removed from one another. In a particular type of interrogation, for example, the frequency of the receiving signal is determined by the primary radar frequency of the interrogation station. Since primary radar apparatus can function with very different frequencies, the transponder antenna, therefore, must be able to receive over an extremely large frequency bandwidth, for example, over several octaves.

The polarization of the transmitting signal and the receiving signal of the transponder antenna arrangement can be the same, for example, vertical, or orthogonal relative to one another, for example, vertical/horizontal.

For an identification system having narrowly adjacent frequency ranges for receiving and transmitting (1030/1090 MHz) it is known to employ an omnidirectional antenna (unipole antenna or annular gap antenna). For receivers and transmitters in different frequency bands, most frequently, integrated-designed double antennas having omnidirectional patterns are employed. Such antennas are known in the art; for example, reference may be taken to the German published application Nos. 2,354,550 and 2,629,502.

In all known cases, the transponder antenna retransmits the reply signal, however, by means of an omnidirectional radiation pattern. This signifies an unnecessary scattering of the radiated energy which results in a low antenna gain and, in the presence of many interrogated objects, in an enormously strong radio room load. The radio room load causes a superposition of the reply signals and reciprocal interference, as a consequence of which the interrogation safety is reduced or the interrogation is prevented altogether. An additional disadvantage of the radiation of the reply signals from the target transponder by means of an omni-directional radiation pattern is the danger of the target being detected by enemy reconnaissance systems.

SUMMARY OF THE INVENTION

It is the object of the present invention to provide a secondary radar transponder which operates such that an excessive radio room load and the above-described detectability are avoided.

According to the invention, the above object is achieved, in a secondary radar transponder of the type mentioned above, in that the antenna arrangement is composed of several individual antennas, each of which covers a specific sector with its major lobe, and together all such antennas cover the entire 360° range. The individual antennas are connected to a receiver, respectively, and, through comparison of the receiving level in the individual receivers, that particular sector from which the respective interrogation signal arrives, is determined. The reply signal triggered by the interrogation signal is radiated only by that particular individual antenna which covers the sector of incidence of the preceding interrogation signal.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
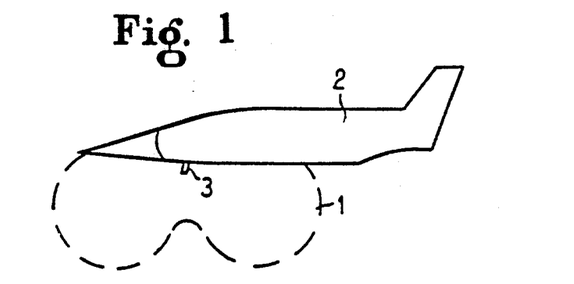
FIGS. 1 and 2 illustrate the radiation patterns of a known omnidirectional transponder antenna.
Figure 2:
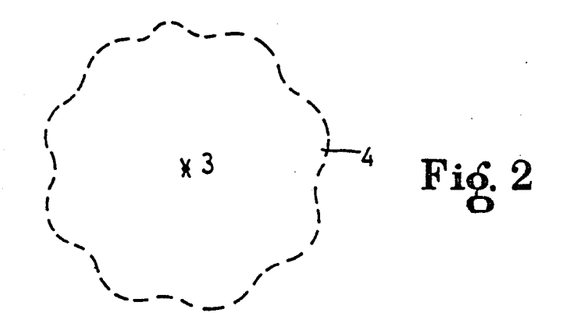

Referring first to FIGS. 1 and 2, FIG. 1 illustrates the vertical radiation pattern of an omnidirectional transponder antenna 3 mounted on an aircraft 2. In FIG. 2, the horizontal radiation pattern 4 of the transponder antenna 3 is illustrated. In order to avoid excessive radio room loading and easier detectability in the case of such a known all-around response transponder antenna 3, in accordance with the present invention, a directional radiation pattern is employed in the transmitting mode. Since the reply signal must be radiated in the direction of the respectively incident interrogation signal, a receiving antenna array ascertains the direction of incidence.

Figure 3:
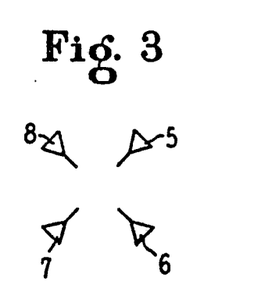
FIG. 3 illustrates a principal antenna arrangement of a transponder antenna arrangement having direction selection according to the present invention.
Figure 4:
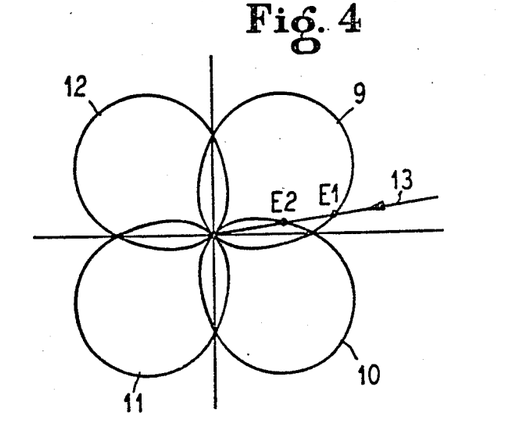
FIG. 4 illustrates the principle of such direction selection.

FIG. 3 illustrates, for this purpose, a basic antenna array having, for example, four individual antennas 5, 6, 7 and 8, which, in terms of radiation direction, are offset through 90° relative to one another, respectively, and by way of which also the transmission of the transponder reply signals takes place. The respective horizontal radiation patterns of the major lobes of the four individual antennas 5–8 are illustrated in FIG. 3. Each of the four individual antennas 5–8 covers, with its respective major lobe 9, 10, 11 and 12, a corresponding sector, and together all cover the total 360° range. If each of the individual antennas 5–8 is connected to a respective receiver, in the case of an interrogation signal which is incident from a direction 13, that particular sector from which the interrogation signal arrives can be determined through a comparison of the receiving levels E1/E2. In the case of a connection of a receiver in chronological succession to the individual antennas, a disadvantageous reduction in the acquisition probability would result. The reply signal is radiated only by that particular individual antenna which covers the sector of the direction of incidence of the previously received interrogation signal. In the example set forth in FIG. 4, in the case of the direction of incidence indicated by the arrow 13, this would be the individual antenna 5, since the receiving level E1 of its major lobe 9 is relatively the largest. The more individual antennas are employed, the more direction-selective is the operation of the transponder and the greater also the antenna gain becomes. The receiver sensitivity can be reduced, so that the expense for the receivers remains within limits. An advantageous number of individual antennas and receivers, respectively, lies between 4 and 8.

Figure 5:
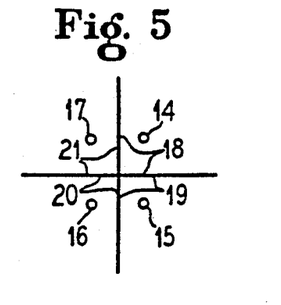
FIG. 5 illustrates an example of an antenna arrangement operating in accordance with this principle.
Figure 6:
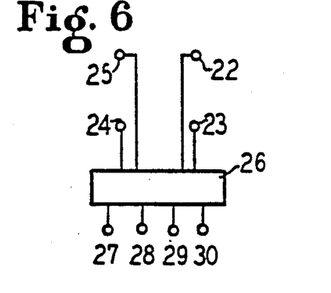
FIG. 6 illustrates another antenna arrangement operating according to this principle.

Schematic examples of antenna principles for sector antennas of this type are illustrated in FIGS. 5 and 6. FIG. 5 shows four individually fed radiators 14–17 which are arranged on the corners of the square and lie in front of respective angle reflectors 18–21. FIG. 6 illustrates a multiple antenna, consisting of four individual antennas 22–25, which is connected to a matrix 26, for example, a Butler matrix. The matrix 26 has a number of outputs 27–30, corresponding to the individual antenna number, so that, in the case of feeding at one of the inputs, respectively, a radiation pattern having a sector-covering major lobe results, respectively.

Figure 7:
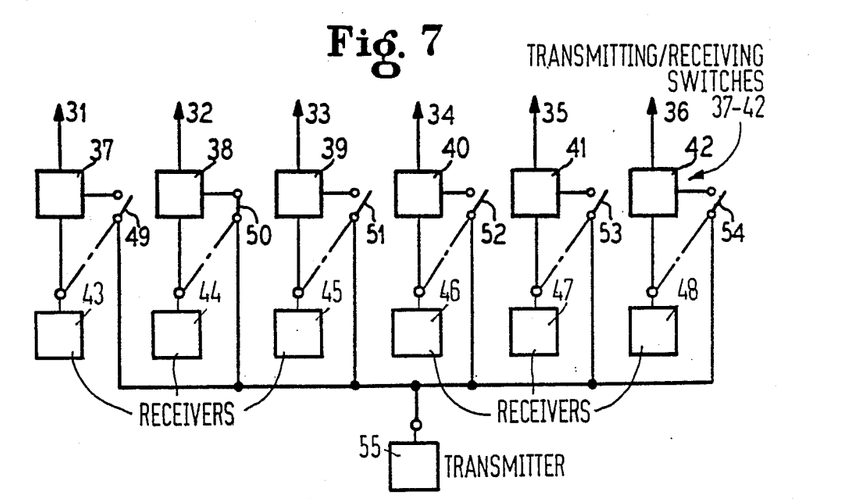
FIG. 7 is a block circuit diagram of a six-sector antenna, in which each individual antenna can be employed in the receiving mode and in the transmitting mode.

FIG. 7 illustrates an example of the interconnection of individual antennas and receivers, as well as the transmitter of a transponder for the use of a plurality of the same individual antennas 31–36 in the transmitting mode and the receiving mode. At each of the individual antennas 31–36, a transmitting/receiving switch 37–42, respectively, is connected, whose receiver input is in each case connected with an individual receiver 43–48, associated with a respective individual antenna, and whose transmitting input can in each case be connected, by way of a microwave switch 49–54, to a common transponder transmitter 55 serving the purpose of reply transmission. Only that particular microwave switch 49–54 is here switched through, respectively, which is connected to that particular transmitting/receiving switch 37–42 by way of which the relatively greatest receiving level occurred previously during reception of the interrogation signal. In the illustrated example, the receiver 44 receives the most energy so that the transmitter 55 is connected to the individual antenna 32 by way of the microwave switch 50 and the transmitting/receiving switch 38.

Figure 8:
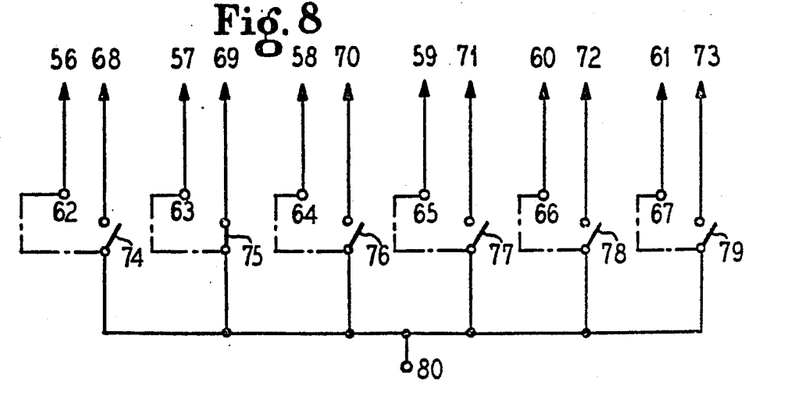
FIG. 8 is a circuit diagram of a six-sector antenna, in which different individual antennas which are seperated from one another are employed for transmitting and for receiving.

For utilization of separate transmitting and receiving antennas, such as is the case with greatly different transmitting and receiving frequencies, or with different polarizations, the transmitting/receiving switch is omitted, which leads to a simpler circuit arrangement of the type illustrated in FIG. 8. Here, each of the individual receiving antennas 56–61 is directly connected with a receiver 62–67, and each of the individual transmitting antennas 68–73 is connected, by way of a microwave switch 74–79, respectively, to a common transponder transmitter 80 serving the purpose of reply signal transmission. Here, only that particular microwave switch 74–79 is switched through which is assigned to that particular individual antenna 56–61 which received the greatest energy level previously during reception of the interrogation signal. In the case illustrated in FIG. 8, the receiver 63 receives the most energy by way of the antenna 57, so that the transmitter 80 is connected to the individual transmitting antenna 69 by way of the microwave switch 75.

For accomplishing the switching structure, many circuits are well known in the art and have been symbolically illustrated in FIGS. 7 and 8 by broken dash-dot lines.

The group of individual transmitting antennas 68–73 can then be separately arranged, for example, under the group of individual receiving antennas 56–61, or the individual transmitting antenna or receiving antenna assigned to a sector can be housed in an integrated fashion, respectively, for example in an angle reflector.

As an extremely wide-band transponder individual receiving antenna, such as is necessary in the case of interrogations by various radar apparatus having entirely different frequencies, a V-shaped directional antenna having a high-pass characteristic is advantageous whose fundamental principal shall be explained on the basis of FIGS. 9–13.

Figure 9:
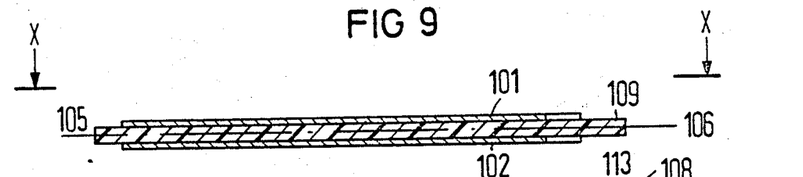
FIG. 9 is a longitudinal sectional view of an individual receiving antenna generally taken along the parting line IX (XI)—IX (XI) of FIG. 10.
Figure 10:
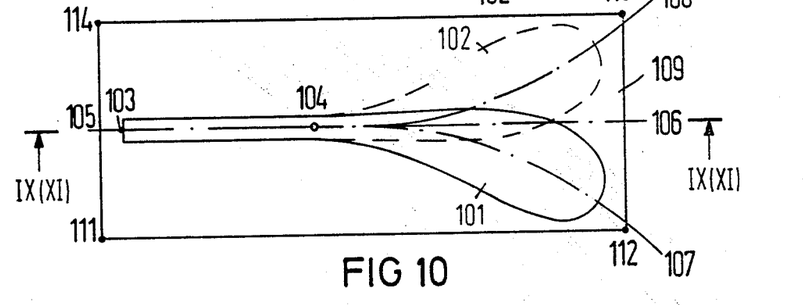
FIG. 10 is a plan view of the antenna of FIG. 9 as viewed in the direction X—X.
Figure 11:
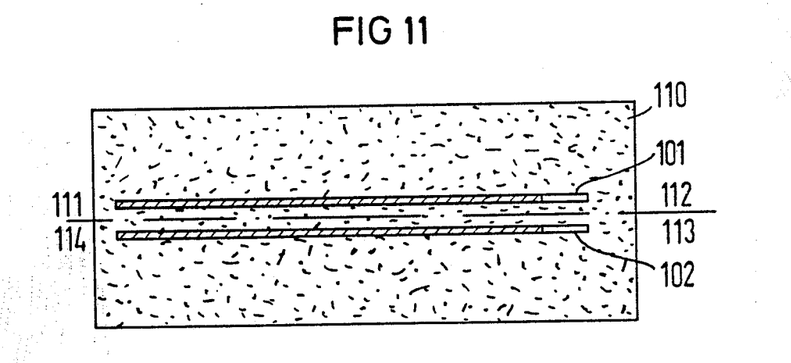
FIG. 11 is a sectional view of an antenna of the type illustrated in FIGS. 9 and 10, shown in section as generally taken along the parting line IX (XI)—IX (XI) of FIG. 10, and encased in a hard foam bed.

FIGS. 9 and 10 illustrate, in section and in a plan view, such an individual receiving antenna. The antenna comprises two areal-designed radiator halves 101 and 102 which, proceeding from an antenna feed location 104, diverge in an approximately V-shaped fashion, then, with respect to their area width, are expandingly designed up to proximate the radiator end and are arcuately closed off at such end. The maximum width of such an individual receiving antenna, just like the maximum length, amounts approximately to half an operating wave length, relative to the longest electromagnetic wave to be transmitted. A particular advantage of this very wide-band directional antenna is its extremely small dimensions. The two radiator halves are fed by a symmetric double line 103–104. The center lines 105–107 and 105–108 of the two radiator halves 101 and 102 extend symmetrically from the common center lines 105–106, i.e. the center line of the entire individual receiving antenna. The low-loss line 103–104 is increasingly loaded from the antenna feed location 104 with radiation resistances, conditioned by the radiator half surfaces which extend to become wider, to such an extent that a line-conducted electromagnetic wave of the symmetric feed line 103–104, proceeding from the feed location 104 of the antenna, is transferred in a virtually jolt-free fashion into a wave of the free space at the widest location of a radiator and that the input resistance of such an individual receiving antenna thereby remains virtually constant over a large frequency range, at least over three octaves. The two radiator halves 101 and 102 are disposed, as illustrated, on two opposite sides of an insulating plate 109 which is represented, for example, by an etched, double-clad plate, or the same are mounted on spacer support mountings consisting of insulating material. Both embodiments can be embedded in a hard foam material 110, such as is illustrated in FIG. 11 in a longitudinal sectional view, taken generally along the parting line IX (XI)—IX (XI) of FIG. 10. The center lines of the two radiator halves 105–107 and 105–, 108, in the case of using a clad plate 109, extend parallel to the center plane 111-112-113-114 of the individual receiving antenna. In the case of use of the individual spacing pieces, however, they can also advance from this center plane in the direction of the radiator end. In order to obtain the orientation of a specific, desired polarization plane, the possibility also exists of rotating the radiators at least partially relative to the plane of the feed location 104. Circular polarization can be realized through the utilization of two radiator halve pairs oriented orthogonally relative to one another and fed with a 90° phase shift.

The boundary lines of the radiator halves 101 and 102 are lines of curvature which are formed, for example, by an exponential function, a trigonometric function, or an elliptical function, or they are approximately simulated by a polygonal curve. The radiator halves 101 and 102 can be designed as sheet metal surfaces, in a grid-shaped fashion, in a manner so as to split the radiation pattern into side lobes, or also in a slotted fashion. The size of the grid apertures can be uniform or can grow with an increasing distance from the antenna feed location 104.

In order to improve the directional effect, an individual receiving antenna, such as illustrated in FIGS. 9 and 10, can be arranged in an angle reflector 115.

Figure 12:
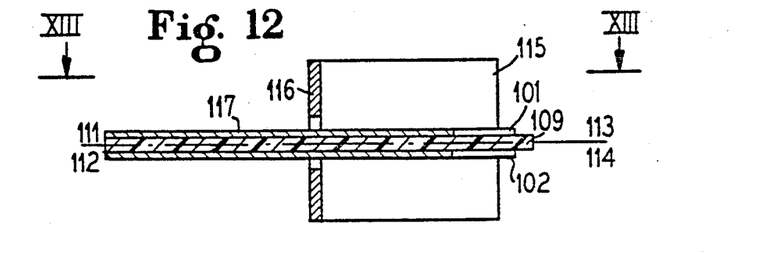
FIG. 12 is a longitudinal sectional view of a receiving antenna of the type illustrated in FIGS. 9 and 10, provided with an angle reflector, as viewed generally along the parting line XII—XII of FIG. 13.
Figure 13:
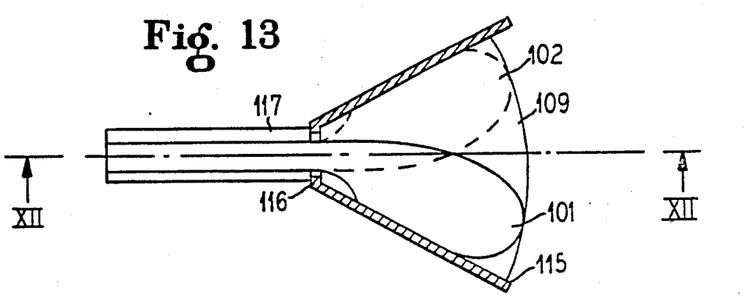
FIG. 13 is a sectional view of the antenna shown in FIG. 12 as viewed generally along the parting line XIII—XIII of FIG. 12.

Such an individual receiving antenna is illustrated in a longitudinal sectional view and in a plan sectional view in FIGS. 12 and 13, respectively. The angle reflector 115 in the vertex perpendicular to the propagation direction, contains a planar reflector component 116 through which the symmetric feed line 117 extends. The radiator halves 101 and 102 are, in a favorable manner, conductively and mechanically connected with the reflector surfaces of the angle reflector 115. In contrast to the embodiment according to FIGS. 9 and 10, the radiator halves 101 and 102 can be designed as free-supporting metal plates without mutual support and can be mounted only at the lateral walls, i.e. the reflector surfaces of the angle reflector 115, as well as through the feed-in at the feed location 104.

Figure 14:
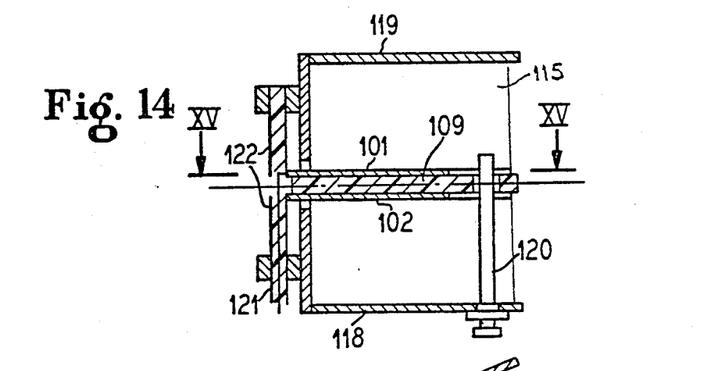
FIG. 14 is a longitudinal sectional view of another individual receiving antenna of the type illustrated in FIGS. 9 and 10, also provided with an angle reflector which is closed off in a funnel-like fashion and provided with an asymmetrical feed as well as an additional bar antenna for transmission, as viewed generally along the parting line XIV—XIV of FIG. 15.
Figure 15:
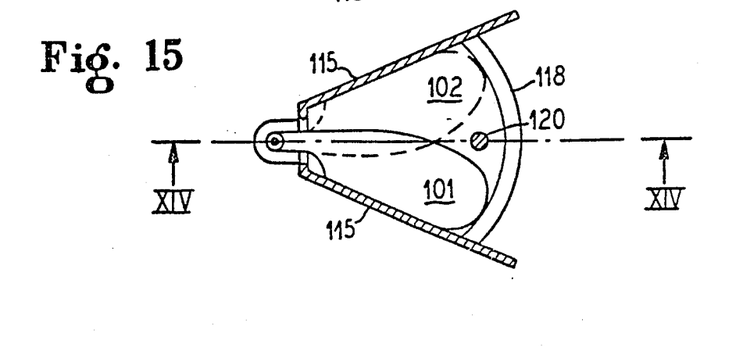
FIG. 15 is a sectional view of the antenna of FIG. 14, as generally viewed along the parting line XV—XV of FIG. 14.

The two bounding parallel planes of the angle reflector 115 relative to the center plane 111-112-113-114 of the individual receiving antenna are either open, or, as illustrated in FIGS. 14 and 15, in a longitudinal sectional view and in a planar sectional view, respectively, there are disposed, at one or two of the boundary surfaces, metallic boundary plates 118 and 119, which either, as illustrated in the exemplary embodiment, are arranged parallel or with a smaller distance in the vertex of the angle reflector 115. An altogether approximately funnel-shaped angle reflector then results. Just like the radiator halves 101 and 102, the reflector 115 and the boundary plates 118 and 119 can be designed in a grid-shaped fashion, in a feathered manner, or in a slotted manner. For the purpose of jolt-free separation of the electromagnetic waves from the individual receiving antenna, it can be advantageous to allow the angle reflector 115 and the boundary plates 118 and 119 to terminate in an oval manner, or in one or more peaks.

The individual receiving antenna having the angle reflector 115 is suitable for accommodating an additional antenna, for example a bar antenna 120, as illustrated in FIGS. 14 and 15, orthogonally relative to the described individual receiving antenna (which is equal to a wide-band directional antenna). The bar antenna 120 is mounted below on the boundary plate 118 and above it is connected through an insulating plate 109. In the case of the transponder application, the bar antenna 120 is employed as an individual transmitting antenna in addition to the wide band individual receiving antenna for the respective sector. Instead of feeding by way of a symmetric line 103-104, as is illustrated in FIGS. 9 and 10, the receiving antenna can also be fed by way of a coaxial cable 121 and a symmetrization member 122. Such feeding is likewise illustrated in FIGS. 14 and 15.

Figure 20:
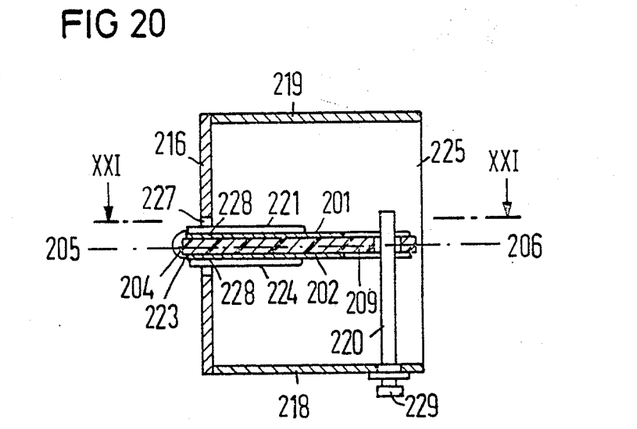
FIG. 20 is a longitudinal sectional view taken generally along the parting line XX—XX of FIG. 21 showing another embodiment of an individual receiving antenna of the type generally set forth in FIGS. 9 and 10, and provided with an angle reflector which is closed off in a follow-like fashion, and an additional bar antenna for transmission.
Figure 21:
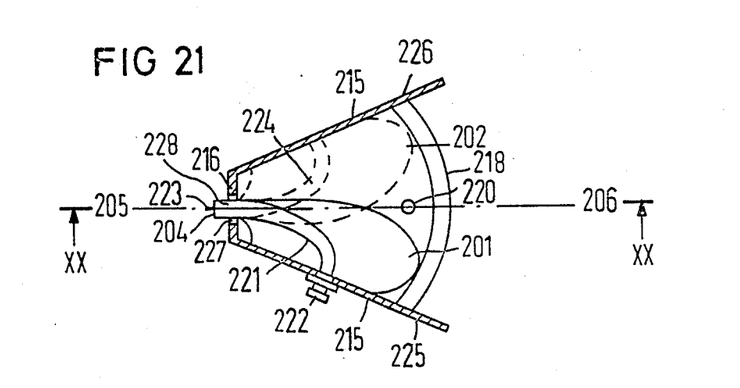
FIG. 21 is a sectional view of the antenna of FIG. 20 taken generally along the parting line XXI—XXI of FIG. 20.
Figure 22:
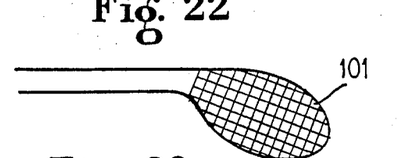
FIG. 22 shows a grid-shaped radiator surface 101, such as can be employed, for example, in the arrangement according to FIG. 13, the second radiator half 102 not being illustrated for reasons of simplicity because it is designed exactly as the radiator half 101.
Figure 23:
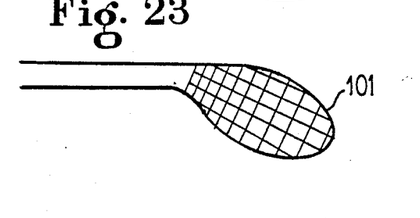
FIG. 23 shows a grid-shaped radiator surface 101 such as can be likewise employed in the arrangement according to FIG. 13, the size of the grid openings here increasing with increasing distance from the feed location, the other radiator half 102 being likewise omitted in FIG. 23 since it is designed the same as the radiator 101.
Figure 24:
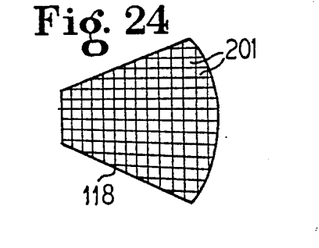
FIG. 24 illustrates a boundary surface 118 for an arrangement, for example, according to FIG. 15, whereby the grid-shaped openings 201 are provided.
Figure 25:
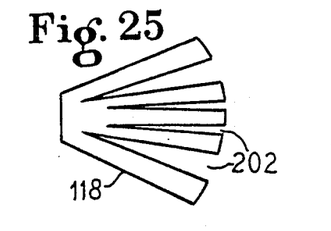
FIG. 25 illustrates a differently-designed boundary surface 118 for an arrangement, for example, according to FIG. 15, whereby pinnate openings 202 are provided.
Figure 26:
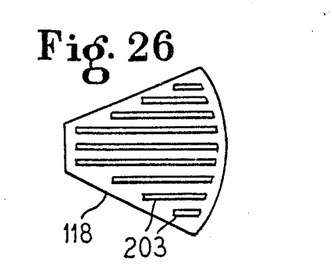
FIG. 26 illustrates a differently-designed boundary surface 118 which can likewise be employed in an arrangement according to FIG. 25 and in which slots 203 are provided, the boundary surface 119 disposed on the other side of the arrangement being designed exactly as the surface 118 and not separately illustrated.
Figure 27:
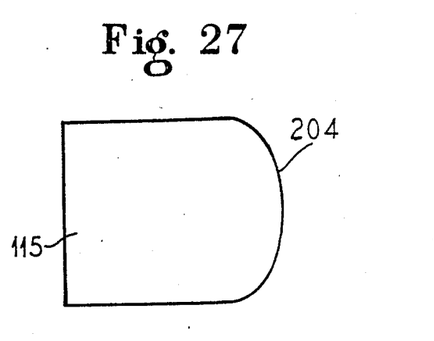
FIGS. 27, 28 and 29 respectively illustrate a lateral wall 115 of the angle reflector such as is employed, for example, in the arrangement according to FIG. 14, the lateral wall terminating in the beam direction according to FIG. 27 with an oval 204, according to FIG. 28 in a tip 205 and according to FIG. 29 with several tips 206.
Figure 28:
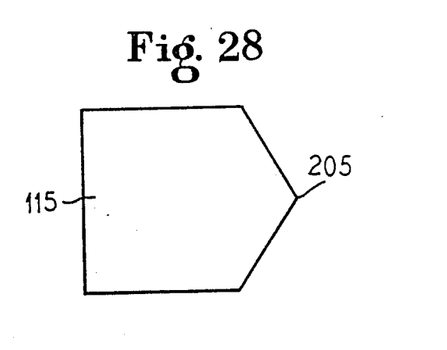
Figure 29:
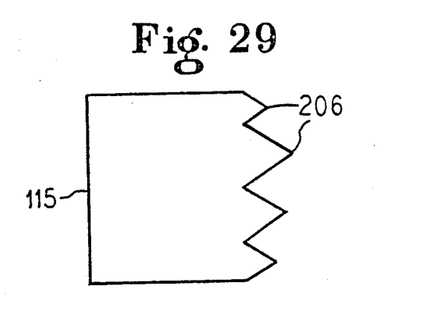

FIGS. 20 and 21 illustrate a differently designed individual receiving antenna which comprises two areal radiator halves 201 and 202 which extend from an antenna feed location 204 and diverge in approximately a V-manner, and then, with respect to their surface width are expandingly designed up to approximately the radiator end and are there arcuately closed off. The maximum width of such an individual receiving antenna, just like the maximum length, amounts to approximately half an operating wave length, relative to the longest electromagnetic wave to be transmitted. A particular advantage of this very wide-band directional antenna is its extremely small dimensions. The center lines of the two radiator halves 201 and 202, as best seen in FIG. 1, advance symmetrically from the common center line 205-206, for example from the center line of the entire individual receiving antenna. The two radiator halves 201 and 202, as illustrated, are disposed on two opposite sides of an insulating plate 209 which is, for example, represented by an etched, double-clad plate, or the same are mounted on spacer support mountings of insulating material.

The boundary lines of the radiator halves 201 and 202 are lines of curvature which are, for example, formed by an exponential function, a trigonometric function, or an elliptical function, or they are approximately simulated by a polygonal curve. The radiator halves 201 and 202, as sheet metal surfaces, can be designed fully complete and imperforate, grid-shaped, in such a fashion so as to split the radiation pattern into side lobes, are also designed in a slotted manner. The size of the grid openings can be uniform, or can increase with an increasing distance from the antenna feed location 204.

The directional effect of the antenna is increased by arrangement in an angle reflector 215. The angle reflector 215, comprising two reflector surfaces 225 and 226, contains in the vertex perpendicular to the propogation direction an additional planar reflector part 216 through which, in an opening 227, a feed section 228 of the two radiator halves 201 and 202 extends. The radiator halves 201 and 202 are conductively and mechanically connected with the reflector surfaces 225 and 226 of the angle reflector 215. The radiator halves 201 and 202 can be designed as free-supporting metal plates without reciprocal support and can be mounted on the lateral faces, for example, the reflector surfaces 225 or 226 of the angle reflector 215, as well as on the feed location 204.

On two boundary surfaces of the reflector surfaces 225 and 226, respectively, metallic boundary plates 218 and 219 can be mounted which are arranged parallel to one another. Altogether, an approximately funnel-shaped angle reflector then results. Just like the radiator halves 201 and 202, the reflector 215 and the boundary plates 218 and 219 can be designed in a grid-shaped fashion, in a feathered fashion or in a slotted fashion. For the purpose of jolt-free separation of the electromagnetic waves from the individual receiving antenna, it can be advantageous to allow the reflector surfaces 225 and 226 of the angle reflector 215 and the boundary plates 218 and 219 to terminate in a ovall fashion or in one or more peaks.

The individual receiving antenna with the angle reflector 215 is suited for accommodating an additional antenna, for example a bar antenna, fed coaxially by way of a connection 229, orthogonally relative to the described receiving antenna (equal to a wide-band directional antenna). The bar antenna 220 is mounted below on the boundary plate 218, and above it extends through the insulating plate 209. In the case of transponder application, the bar antenna 220 is employed as an individual transmitting antenna in addition to the wide-band individual receiving antenna for the respective sector.

The wide-band directional antenna according to the present invention is externally fed by way of a coaxial supply cable (not illustrated). The supply cable can be inserted into a coaxial connector 222. Here, a coaxial cable section 221 connects the coaxial connector 222 in the one reflector surface 225 of the angle reflector 215 with the feed location 204. The symmetrization is directly effected by the radiator halves 201 and 202 themselves. The external conductor of the cable section 221, via its entire length, is metallically connected with the radiator half 201 and also lies on top of the radiator half 201. The internal conductor 223 is connected with the radiator half 202 at the feed location 204. In order to simulate the cable section 221, in a corresponding manner, below on the radiator half 202, a second cable section 224 is provided and its external conductor is metalically connected with the radiator half 202, likewise over its entire length. It acts with its exterior contour and thus renders possible a comparatively good symmetry of the radiator halves 201 and 202 with respect to the angle reflector 215. The inner conductor of the cable section 224 is not required and is therefore not connected. The two cable sections 221 and 224 are arranged in a mirror-symmetric fashion relative to one another in relation to the radiator longitudinal axis 205-206.

Figure 16:
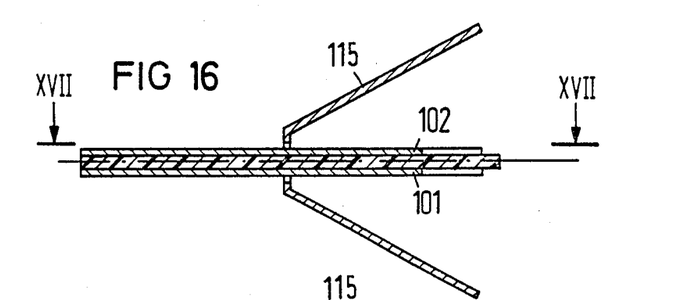
FIG. 16 is a longitudinal sectional view of another receiving antenna of the type generally shown in FIGS. 12 and 13, but with orthogonal polarization relative thereto, as seen generally along the parting line XVI—XVI of FIG. 17.
Figure 17:
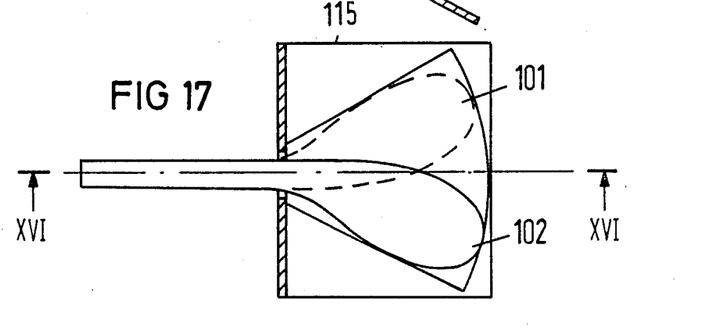
FIG. 17 is a sectional view of the antenna of FIG. 16 as generally viewed along the parting line XVII—XVII.
Figures 18, 19:
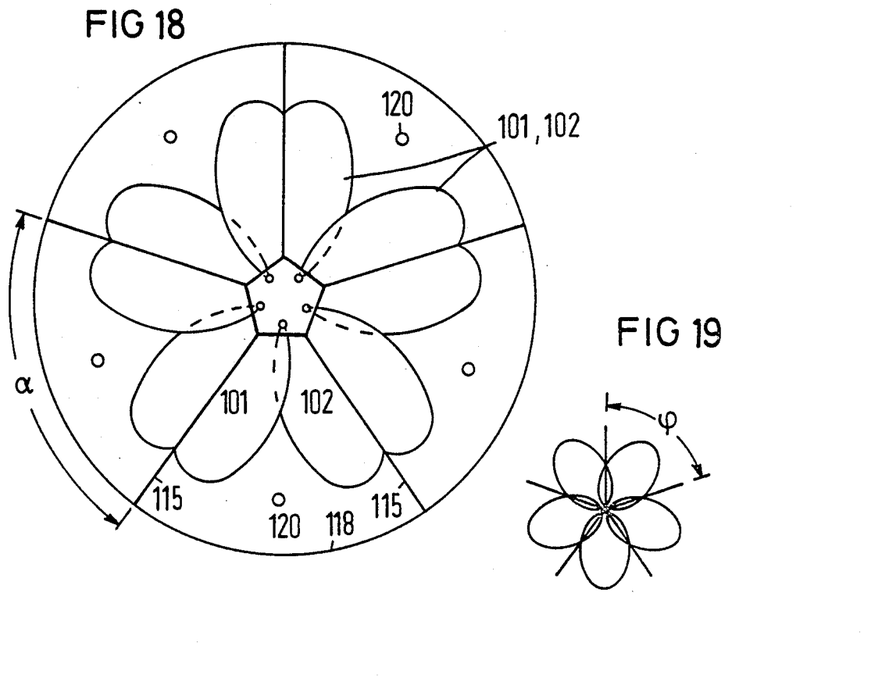
FIG. 18 shows, in a plan view, a circular array of wideband receiving antennas and transmitting antennas which are assigned to a sector, respectively.
FIG. 19 shows a section taken through the radiation lobes of a circular array of antennas according to FIG. 18.

If a polarization is desired other than the previously described polarization, for example a polarization which is rotated through 90° with respect to the described polarization, the radiators 101 and 102 of FIGS. 16 and 17 can be introduced in an angle reflector 115. Several angle reflector antennas of the described type can be arranged as individual antennas in a sector-type manner in a circular array. Such an arrangement having five individual antennas is illustrated in FIG. 18. The reference characters in FIG. 18 agree with those of FIGS. 9-15. The angle α of the beam φ of the angle reflector 115 can correspond to the sector (see FIG. 19) to be covered by the individual antenna, or it can be smaller. A horizontal diagram of the lobes of the five individual antennas illustrated in FIG. 18 is shown in FIG. 19. The major lobes of the individual antennas, in their totality, cover a 360° range; however, as a transponder antenna in the case of an individual evaluation, they offer the possibility of ascertaining the angular range of the incident signal.

Such a circular antenna array according to FIG. 18 can be realized, for example, with only a correspondingly etched, double metal-clad insulating plate.

For a special formation (for example beam enlargement, gain increase) of the radiation patterns to be evaluated, an interconnection of adjacent individual antennas can be carried out.

Although we have described our invention by reference to particular illustrative embodiments thereof, many changes and modification of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An antenna structure for a secondary radar transponder, comprising: a pair of spaced radiator halves which extend from a feed
    location in a V-shaped diverging pattern toward
    a radiator end; and said radiator halves rotated at least partially with respect
    to the plane of feeding and each of said halves including a surface width which increases toward said radiator end and is arcuately terminated thereat.

2. The antenna structure of claim 1, and further comprising:
    an insulating layer carrying said radiator halves on opposite surfaces thereof.

3. The antenna structure of claim 2, wherein:
    said insulating layer and radiator halves are constituted by an etched, double metal-clad insulating plate.

4. The antenna structure of claim 2 and further comprising:
    for each pair of radiator halves, a separate symmetrical double-line feed extending from the feed location on opposite sides of said insulating layer.

5. The antenna structure of claim 1, and further comprising:
    support mounting means; and wherein
    said two radiator halves are mounted on said support mounting means.

6. The antenna structure of claim 5, wherein:
    said support mounting means have increasing length in the direction of said radiator end.

7. The antenna structure of claim 1, wherein:
    the radiator halves are at least partially defined by boundary lines of curvature which follow an exponential function.

8. The antenna structure of claim 1, wherein:
    the radiator halves are at least partially defined by boundary lines of curvature which follow a trigonometric function.

9. The antenna structure of claim 1, wherein:
    the radiator halves are at least partially defined by boundary lines of curvature which follow an elliptical function.

10. The antenna structure of claim 1, wherein:
    the radiator halves are at least partially defined by boundary lines of curvature which follow a simulated polygonal function.

11. The antenna structure of claim 1, wherein:
    each of said radiator halves are sheet metal surfaces.

12. The antenna structure of claim 1, wherein:
    each of said radiator halves is a grid-shaped structure.

13. The antenna structure of claim 12, wherein:
    each of said radiator halves includes grid openings of equal size.

14. The antenna structure of claim 1, wherein:
    the maximum width and the maximum length of each radiator half is approximately half the wavelength of the longest electromagnetic wave to be transmitted.

15. The antenna structure of claim 1, and further comprising:
    an angle reflector including two metallic surfaces which are divergent in the direction of the radiator end.

16. The antenna structure of claim 15, wherein:
    the two radiator halves are mechanically and electrically connected to one of the two reflector surfaces of the angle reflector.

17. The antenna structure of claim 15, and further comprising:
    an additional antenna secured to said angle reflector orthogonally to the plane of said radiator halves.

18. The antenna structure of claim 17, wherein:
    said additional antenna comprises a rod-shaped radiator.

19. The antenna structure of claim 17, wherein:
    said additional antenna is a transmitting antenna.

20. The antenna structure of claim 15, and further comprising:
    coaxial cable feed means; and
    symmetrization means secured behind the vertex end of the divergent structure.

21. The antenna structure of claim 1, and further comprising:
    an etched feed system integrated with said antenna.

22. The antenna structure of claim 1, comprising:
    a plurality of said antenna structures each including an angle reflector and all mounted in a circular array to define a plurality of sectors.

23. The antenna structure of claim 22, wherein:
    the aperture angle ($\alpha$) reflector corresponds to a boundary angle ($\phi$) of the sector to be covered by the respective antenna.

24. The antenna structure of claim 22, wherein:
    the aperture angle ($\alpha$) reflector is smaller than the boundary angle ($\phi$) of the sector to be covered by the respective antenna.

25. The antenna structure of claim 22, wherein:
    all of said radiator halves comprise a single, etched, double metal-clad insulating plate.

26. The antenna structure of claim 22, wherein:
    said radiator halves of adjacent antennas are selectively connected to produce specific radiation patterns.

27. An antenna structure for a secondary radar transponder, comprising:
    a pair of spaced radiator halves which extend from a feed location in a V-shaped diverging pattern toward a radiator end; and
    each of said radiator halves having a surface width which increases toward said radiator end and is arcuately terminated thereat,
    each of said radiator halves being a grid-shaped structure including grid openings which increase in size away from the feed location.

28. An antenna structure for a secondary radar transponder, comprising:
    a pair of spaced radiator halves which extend from a feed location in a V-shaped diverging pattern toward a radiator end; and each of said radiator halves including a surface width which increases toward said radiator end and is arcuately terminated thereat, and hard foam material embedding said radiator halves.

29. An antenna structure for a secondary radar transponder, comprising:
   a pair of spaced radiator halves which extend from a feed location in a V-shaped diverging pattern toward a radiator end;
   each of said radiator halves having a surface width which increases toward said radiator end and is arcuately terminated thereat;
   an angle reflector including two metallic surfaces which are divergent in the direction of the radiator end;
   the two radiator halves being mechanically and electrically connected to one of the two reflector surfaces of the angle reflectors;
   a coaxial cable connection mounted in one of said two reflector surfaces; and
   a coaxial cable section connecting said coaxial cable connection to said feed location, including an external conductor which is conductively connected over its length to one of said radiator halves and an inner conductor connected at the feed location to the other radiator half.

30. The antenna structure of claim 29, and further comprising:
   another coaxial cable section including an outer conductor which is electrically connected over its length to said other radiator half in a mirror-symmetrical arrangement with respect to the first mentioned coaxial cable section, the inner conductor of the latter coaxial cable being unconnected.

31. The antenna structure of claim 30, and further comprising:
   etched printed wiring boards constituting the coaxial cable sections.

32. An antenna structure for a secondary radar transponder, comprising:
   a pair of spaced radiator halves which extend from a feed location in a V-shaped diverging pattern toward a radiator end;
   each of said radiator halves having a surface width which increases toward said radiator end and is arcuately terminated thereat;
   an angle reflector including two metallic surfaces which are divergent in the direction of the radiator end; and
   means mounting said radiator halves and said feed location and at said reflector surfaces.

33. The antenna structure of claim 32, wherein:
   said reflector comprises a planar reflector section perpendicular to the direction of propagation at its vertex.

34. The antenna structure of claim 33, and further comprising:
   parallel metallic boundary elements connecting said reflector surfaces at the farthest points in respect of the direction of propagation.

35. The antenna structure of claim 34, wherein:
   said reflector surfaces and said metallic boundary elements are homogeneous metallic plates.

36. The antenna structure of claim 34, wherein:
   said boundary elements are grid-shaped elements.

37. The antenna structure of claim 34, wherein:
   said boundary elements are feathered elements.

38. The antenna structure of claim 34, wherein:
   said boundary elements are slotted elements.

39. The antenna structure of claim 34, wherein:
   said reflector surfaces, in the direction of propagation terminate in an oval fashion.

40. The antenna structure of claim 34, wherein:
   said reflector surfaces, in the direction of propagation terminate in at least one peak.

41. The antenna structure of claim 34, wherein:
   said reflector surfaces, in the direction of propagation terminate in a plurality of peaks.

* * * * *